United States Patent [19]
Miller et al.

[11] Patent Number: 4,617,908
[45] Date of Patent: Oct. 21, 1986

[54] TOP-FIRING FOOD STEAMER

[75] Inventors: Dye O. Miller, Barrington; August J. Antunes, Oak Brook; Jerome Antunes, Clarendon Hills; Ronald Godsen, Lombard, all of Ill.

[73] Assignee: A. J. Antunes & Co., Addison, Ill.

[21] Appl. No.: 699,760

[22] Filed: Aug. 12, 1985

[51] Int. Cl.[4] .................................................. A21B 1/08
[52] U.S. Cl. ..................................... 126/20; 126/369; 219/401; 99/467
[58] Field of Search ................ 126/20, 348, 369, 377; 99/413, 417, 467, 483; 219/385, 387, 391, 401, 407

[56] References Cited

U.S. PATENT DOCUMENTS

| 3,236,172 | 2/1966 | Haedike et al. | 126/20 X |
| 3,320,945 | 5/1967 | Dunkelman | 126/369 |
| 3,502,065 | 3/1970 | Lassiter | 126/369 X |
| 3,794,016 | 2/1974 | Binks et al. | 126/369 |
| 3,949,733 | 4/1976 | Miller et al. | 126/348 |

Primary Examiner—Margaret A. Focarino
Attorney, Agent, or Firm—McDermott, Will & Emery

[57] ABSTRACT

An improved steam heating apparatus is provided for top heating of food items such as pastries, rolls, sandwiches or the like to render them appetizing in appearance and taste, and, in particular, for melting garnishes or toppings such as cheese on food items and simultaneously heating the food item prior to serving. The top-firing steamer comprises a generally flat, heated, steam-generating platen which defines a steam-generating chamber; a food steaming chamber located under the platen; and a plurality of raised perimeter apertures extending perpendicularly through the platen to allow steam to effuse downwardly from the steam-generating chamber into the food steaming chamber below, while preventing unvaporized water collected on the heated platen from draining into the food steaming chamber.

23 Claims, 10 Drawing Figures

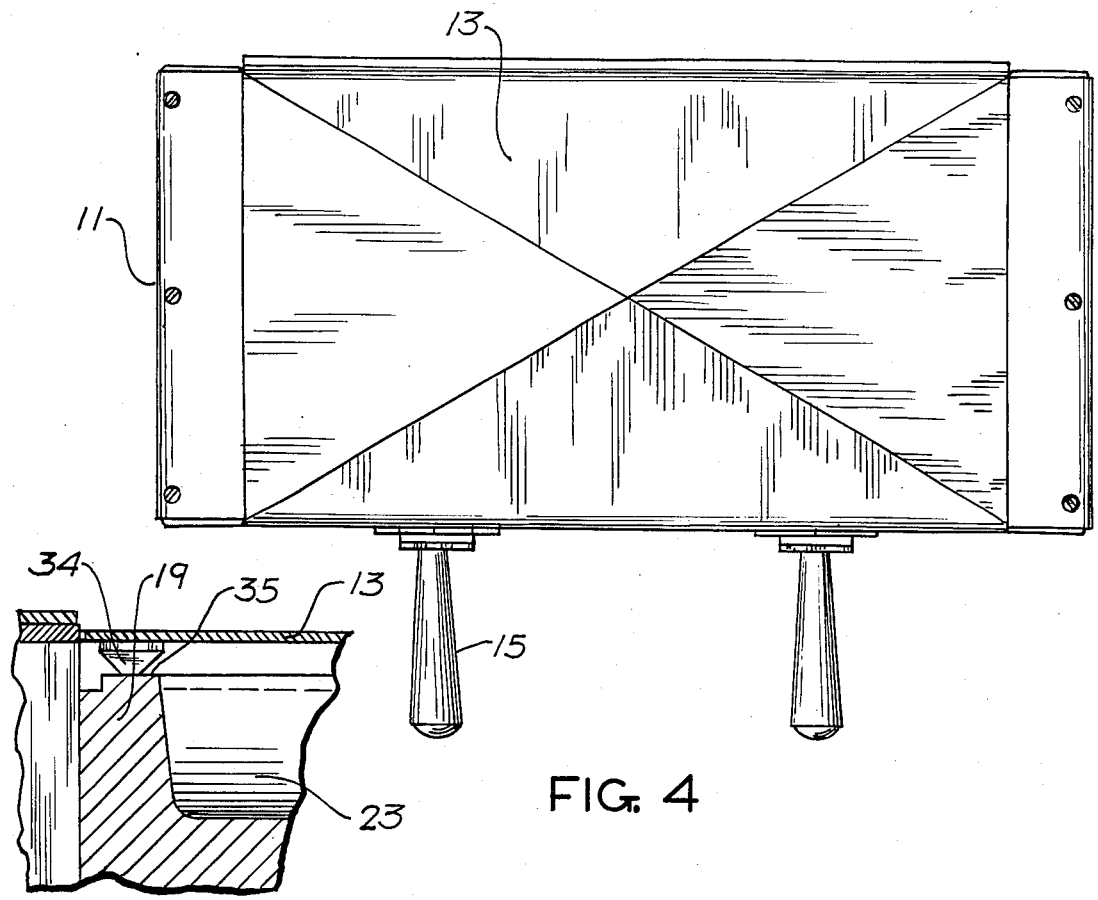
FIG. 4
FIG. 10
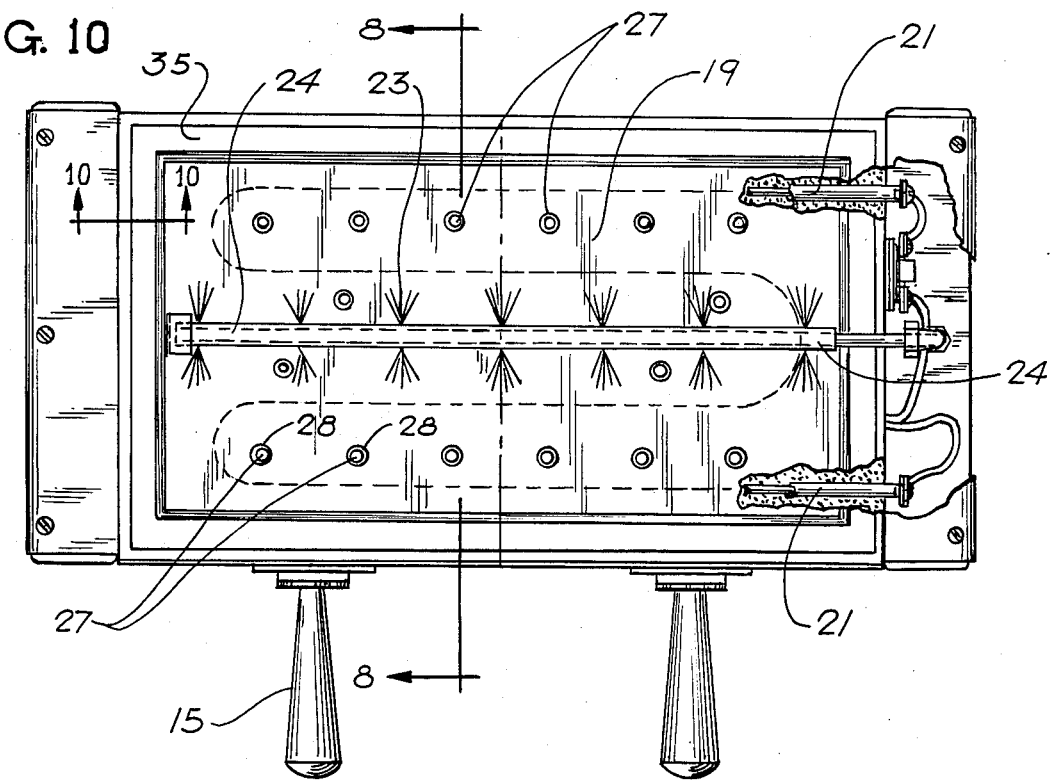
FIG. 5

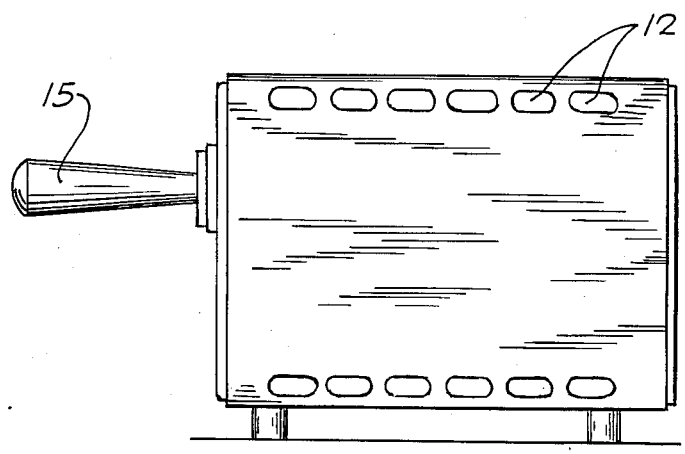
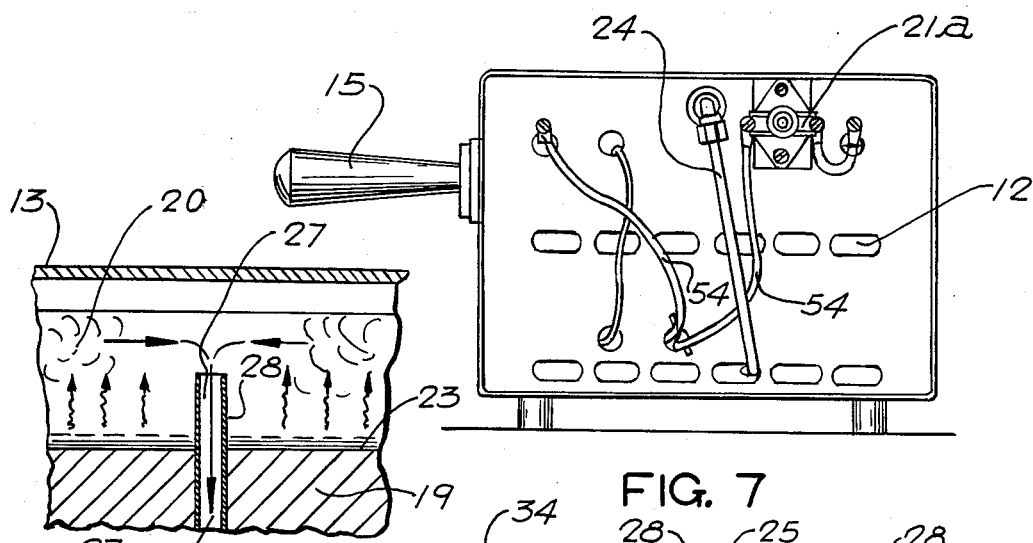
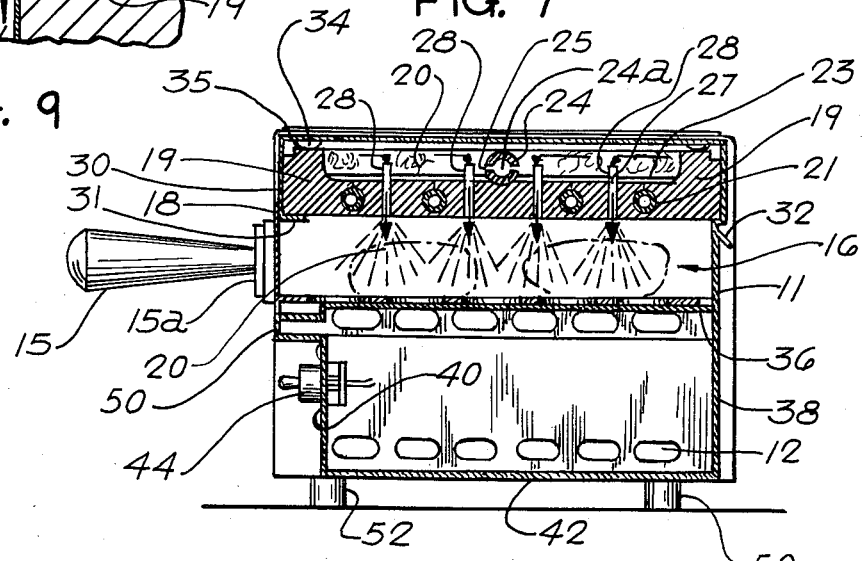

TOP-FIRING FOOD STEAMER

BACKGOUND OF THE INVENTION

1. Field of the Invention

This invention relates to devices for steam heating of foods or the like, such as those that have been precooked or may have becme somewhat stale. In particular, the present invention is a top-firing steamer for use in connection with foods having a topping or garnish which it is desired to melt or soften prior to serving such as cheese topping on nachos.

2. Description of the Prior Art

Food steamers similar to the present invention have been known and are used for the steam heating of foods by treating the foods with steam in a closed chamber on perforated plates. In most of these devices, a heated platen is provided with a plurality of orifices therein through which water is sprayed and either simultaneously vaporized, or vaporized upon contact with the heated platen. Since precooked foods tend to lose much of their natural juices and moisture, steam heating provides a natural advantage in restoring moisture to the foods while they are reheated. This restoration of moisture assists in restoring the natural appetizing appearance, texture, and taste of the food.

Our previous patent, Miller et al. U.S. Pat. No. 3,949,733 (1976); addressed a major problem found in prior steam heating devices, namely, that the orifices in the heated platen become clogged by solid particles or impurities which remain in the nozzle or spray orifices when the water is vaporized. The prior devices required periodic dismantling to clean the clogged orifices. The '733 Patent obviated these problems by providing an apparatus in which a thermally insulated water inlet tube introduces water at a relatively cool temperature into the steam-generating chamber and onto the top of the platen.

However, a disadvantage of the device disclosed in our U.S. Pat. No. 3,949,733 is that food to be steamed is placed into the steaming chamber above the heated platen, thereby effecting steam heating of the food from below. In a number of "fast food" applications it is desirable to have the food steamed from above to melt a topping or garnish prior to serving, but without overheating of the principal food item.

SUMMARY OF THE INVENTION

The object of this invention is to provide a top-firing steam heating apparatus whereby food present in a lower steam heating chamber is heated from above by dry steam passing into the chamber from an upper steam-generating chamber, such that garnished food items may be top-steamed without overheating the principal food item.

This and other objects of the present invention are achieved by the provision of a top-firing steam heating apparatus comprising a heated platen for creating steam which defines a steam-generating chamber; a food steaming chamber located below the steam-generating chamber and the heated platen; and raised-perimeter aperture means on the heated platen allowing steam to effuse downwardly from the steam-generating chamber into the food steaming chamber, while preventing unvaporized water collected on the platen from draining into the food steaming chamber.

BRIEF DESCRIPTION OF THE DRAWINGS

FIG. 4 is a top plan view of the steamer with a top cover in place over the steam-generating chamber.

FIG. 5 is a top plan view of the food steamer of the present invention in which the top cover thereof has been removed to reveal the steam-generating chamber, and which is partially cut away to show the heating elements present in the floor (i.e. heated platen) of the steam-generating chamber.

FIG. 6 is a side elevational view of the food steaming device of the present invention showing the food trays inserted.

FIG. 7 is a side elevational view in which the outer side wall has been removed to show the water inlet pipe and the electrical connections to the heating elements.

FIG. 8 is a vertical cross-sectional view taken along lines 8—8 of FIG. 5 illustrating the steam-generating chamber with steam passing into the food steaming chamber below.

FIG. 9 is an enlarged view of a portion of the steam-generating chamber depicted in FIG. 8.

FIG. 10 is a vertical cross sectional view taken along lines 10—10 of FIG. 5.

DETAILED DESCRIPTION OF THE INVENTION

Figure 1:
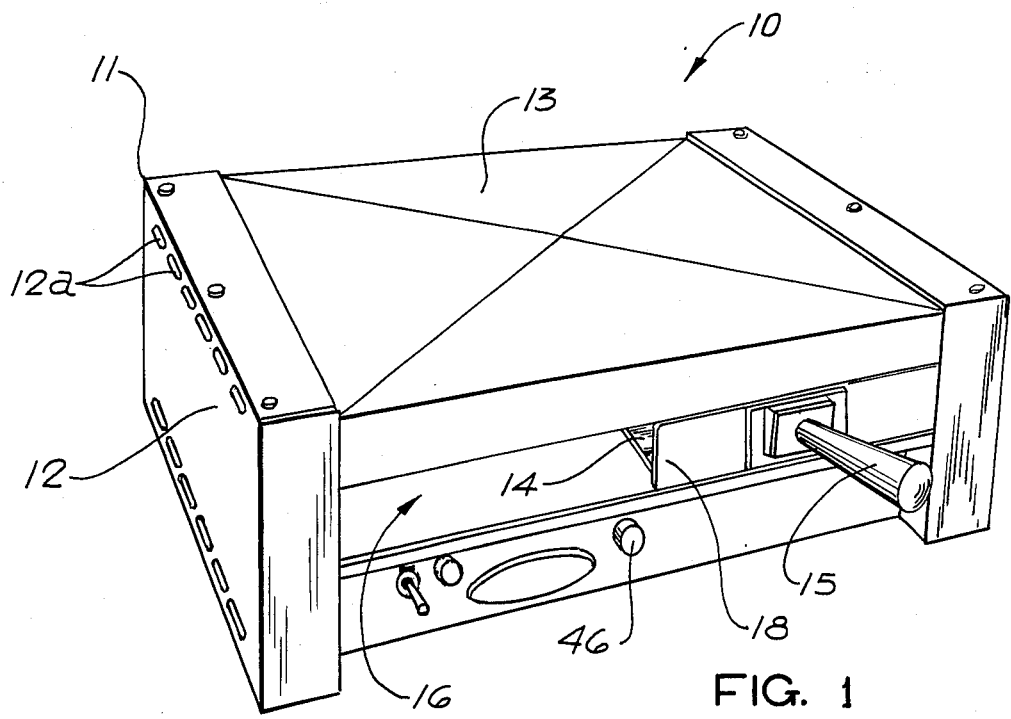
FIG. 1 is a perspective view of the top-firing food steamer of the present invention with a top cover in place over the steam-generating chamber.

The top-firing food steamer of the present invention, generally designated 10 (FIG. 1), is generally designed to operate under atmospheric pressure. The steamer 10 includes a generally rectangular housing 11 having a pair of end panels 12 each of which include a plurality of apertures or vents 12a for ventilation, and a removable top cover 13. One or more spatulas or food trays 14 equipped with insulated handles 15 are used to place food into a steaming chamber 16 of the device. The provision of two trays 14 permit a generally continous operation by alternating with a third tray is desired. Trays 14 have perforations 17 which facilitate the removal of food particles or crumbs and a solid front handle-mounting flange 18 which serves to close the front of the steaming chamber 16 when the trays are placed therein. The handles 15 are mounted by a tapered mount 15a which aligns the centerline of the handle at downward angle relative to the horizontal to facilitate grasping. The angle is generally, approximately 15 degrees but may vary according to a particular installation from between no inclination as shown in FIGS. 6, 7 and 8 to about 30 degrees of incline.

Referring to FIGS. 5 and 8, a heated platen 19 for generating steam 20 is mounted near the top of the housing 11 and is provided with a conventional, insulated, internal heating element 21, connected to an appropriate electrical source (as shown in FIG. 7), a thermostat 21a maintains the platen 19 at a relatively high temperature, approximately 350° in order to generate steam as described below. Platen 19 is structured in the nature of a shallow reservoir such as to define a steam-generating chamber 22 at the bottom of which water 23 is converted to steam. The water 23 is carried to the steam-generating chamber 22 and is sprayed onto the surface of the heated platen 19 by an elongate water inlet tube 24 (FIG. 5). Water-inlet tube 24 is connected to a source of cold water, under suitable pressure, and includes a plurality of side orifices 25 (FIG. 8) through which water is sprayed outwardly onto the heated platen 19 as seen in FIG. 5. Orifices 25 are positioned midway, vertically, along the length of tube 24 to retain some order in the tube at all times, as indicated by water line 26 in FIG. 8. Water in the tube 24 serves to keep the tube at a relatively cool temperature in comparison to the heated platen 19, thus minimizing vaporization within the tube and the accumulation of particulate residue. The water inlet tube 24 includes a Teflon or other heat resistant inner liner 24a which is easily removed to cleaning of deposits simply by flexing the liner 24a.

As shown in FIGS. 5, 8, and 9, the heated steam-generating platen 19 is provided with a plurality of apertures 27 extending perpendicularly through the platen and through which steam, generated on the heated platen 19 in the upper steam generating chamber 22 of the device, is effused downwardly into the food steaming chamber 16. Tubular inserts 28 are secured in the apertures 27, such as by a press-fit, to define raised perimeters 29 thereof such that unvaporized water 23 sprayed onto the platen 19 is prevented from draining into the lower food steaming chamber 16.

The removable cover 13 is designed to be snap-closed over the top of the platen 29 to define the top of the steam-generating chamber 22. The cover 13 has a front portion wall 30 (see FIG. 8) terminating downwardly in a lower tab or ridge 31 which enables the front of the cover to fit against the underside of the platen 19. The rear of the cover 13 is provided with a similar tab 32 which snaps against the bottom rear corner 33 of the platen 19 when the cover 13 is lowered into place. Projection 32 (see FIG. 8) can be grasped at its end and pulled upwardly to disengage the cover from the rear of the platen 19. Removal of the cover 13 facilitates cleaning of the interior of the steam-generating chamber 22. As shown in FIG. 10 the underside of cover 13 is preferably provided with a sealing gasket 34 which rests against the top edge 35 of the platen 19.

The food trays or spatulas 14 rest on the upper surface 36 of a cavity defined in the bottom of the housing 11 in which the various electronic controls and wires are connected to one another. The bottom cavity is defined by the rear wall 38 of the housing, which serves to close the bottom cavity and also the back of the food heating chamber, a front wall 40 and a bottom wall 42. A plurality of electrical and electronic components, such as an on/off switched 44 which powers the calrods 21 and an energizing switch or button 46 are mounted on the front wall 40 for easy access by the operator. The energizer 46 is connected by conventional means to cause a predetermined supply of water to be sprayed onto the heated platen 19 and vaporized after the front of the food heating chamber has been closed by insertion of the trays 14. Preferably, the front wall 40 of the lower chamber is inset slightly so that the controls do not protrude past the front surface of the housing 11. A forwardly extending channel 50 at the top of the front wall 40 provides a stop and support for the bottom edge of the trays 14. A plurality of feet or legs 52 on the bottom of the bottom wall of the housing 11 support the steamer 10 in a slightly elevated position on its supporting surface. The electrical connections 54 and water inlet tube 24, as shown in FIG. 7, enter the lower compartment for a connection to the controls on the front wall 40.

Figure 2:
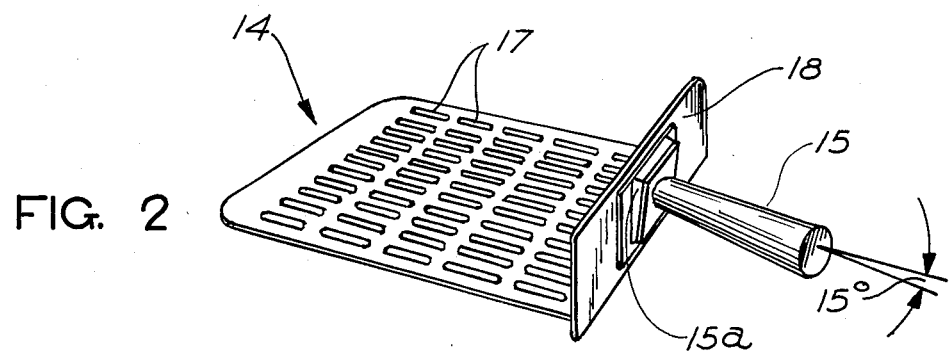
FIG. 2 is a perspective view of a hand-held food tray (shown inserted in FIGS. 1 and 3) which is used to insert and support food within the steaming chamber of the present invention and remove it after heating.
Figure 3:
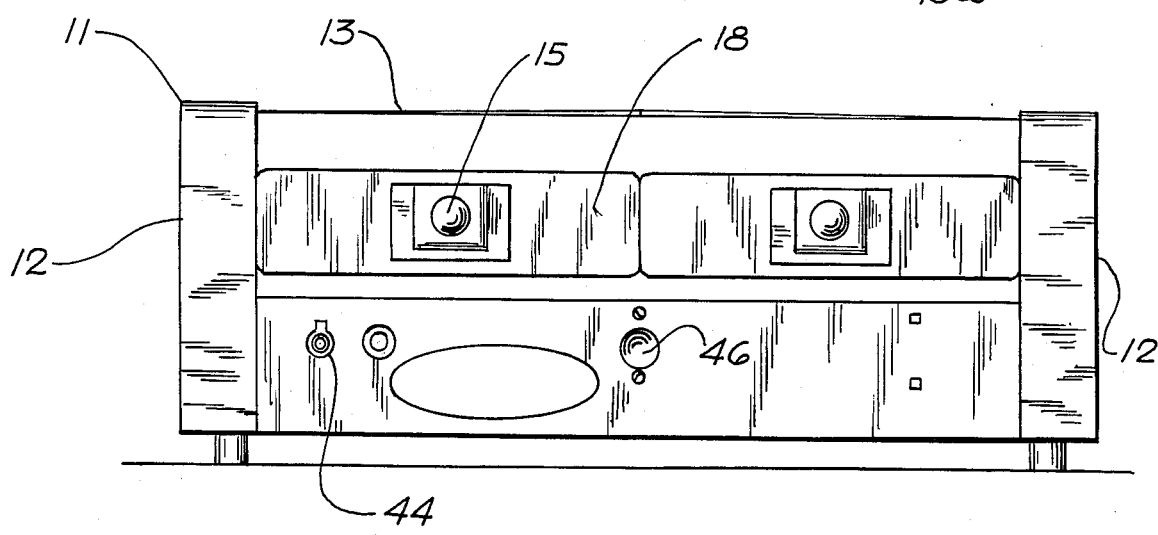
FIG. 3 is a front elevational view of the steamer of the present invention.

Many modifications to the present design are possible. For example, the top cover 13 could be secured, if desired, by threaded bolts or clamps. Likewise, a steam exhaust chimney or vent could be provided at the rear of the food heating chamber 16 to vent excess steam to the atmosphere. Similarly, the handles 15 may be mounted in a horizontal position as shown in FIGS. 6, 7 and 8 although it has been found that most operators prefer the downwardly inclined handle as shown in FIG. 2. Similarly, the raised perimeter apertures 27 may be provided by means other than the tubular sections 28 such as by casting directly in the platen when it is cast. The present invention permits the location of the raised perimeter apertures to be placed at any location within the platen so that a particular pattern may be preferable for a particular food item, such as the melting of cheese on nachos. The passing of the steam through the apertures 27, which extend completely through the heated platen 19 cause the steam to be additionally heated or "super heated" prior to its impingement on the food articles directly below. The top firing steamer of the present invention has been found to be particularly effective in melting or heating food items having a topping or garnish, such as cheese, without overheating or "browning" the food item on which the garnish has been spread.

The foregoing detailed description has been given for clearness of understanding only and no unnecessary limitations should be understood therefrom as some modifications will be obvious to those skilled in the art.

We claim:

1. A top firing steam heating apparatus for heating foods or the like, comprising:
   a housing;
   a platen mounted on the housing to define a steam generating chamber between the platen and top of the housing;
   means for heating the platen;
   a food steaming chamber located beneath the steam generating chamber;
   water inlet means for introducing water from a source thereof onto the heated platen to generate steam in the steam chamber;
   aperture means extending through the heated platen to cause the steam generated within the steam generating chamber to be directed downwardly to impinge the top of food products placed in the food steaming chamber there below; and
   a raised perimeter about the aperture means extending upwardly from the surface of the platen to permit the flow of steam downwardly from the steam generating chamber while preventing unvaporized water from reaching the food steaming chamber.

2. The steam heating apparatus of claim one wherein the water inlet means passes through an aperture in the platen.

3. The steam heating apparatus of claim 1 wherein the water inlet means comprises a flexible element generally parallel to the surface of the steam generating platen and includes a plurality of orifices to distribute the water on the surface of the platen.

4. The steam heating apparatus of claim 3 wherein orifices are positioned along the flexible element between the uppermost and lowermost points therein to maintain a level of water within the tube for cooling purposes.

5. The steam heating apparatus of claim 1 wherein the platen includes a raised perimeter to define a generally dish-shaped platen and said housing cover includes sealing means to engage said raised perimeter to insure the delivery of steam downwardly through the raised perimeter apertures.

6. The steam heating apparatus of claim 5 wherein the platen heating means includes an integrally cast heating coil therein and said raised perimeter apertures are located at a position clear of the coil.

7. The steam heating apparatus of claim 6 wherein the raised perimeter apertures are arranged on the surface of the platen in a predetermined array so that the majority of steam is delivered directly on to the food product.

8. The steam heating apparatus of claim 7 including means removably mounting the flexible inlet water means to permit removal thereof to facilitate flexing of the water inlet means to clean the same of deposits.

9. The steam heating apparatus of claim 1 wherein the raised perimeter about the aperture means is formed by a tubular insert in the aperture which extends upwardly above the top surface of the platen.

10. The steam heating apparatus of claim 9 wherein the platen includes a raised perimeter to define a generally dish-shaped platen and said housing cover includes sealing means to engage said raised perimeter to insure the delivery of steam downwardly through the raised perimeter apertures.

11. The steam heating apparatus of claim 9 wherein the raised perimeter apertures are arranged on the surface of the platen in a predetermined array so that the majority of steam is delivered directly on to the food product.

12. The top firing steam heating apparatus of claim 1 wherein the food steaming chamber includes at least one spatula-type closure including a manually graspable handle mounted at an angle downwardly from horizontal of approximately 15°.

13. In a steam heating apparatus for heating foods or the like generally comprising a steam-generating chamber, a food steaming chamber, water inlet means for delivering water to be vaporized to the steam-generating chamber, and means for effusing steam from the generating chamber to the steaming chamber, wherein the improvement comprises in combination:
a platen for creating steam, the top of said platen defining the bottom of the steam-generating chamber;
means for heating the platen;
a food steaming chamber located under the steam-generating chamber and the heated platen; and
aperture means including a raised perimeter extending above the top surface of the platen extending through the heated platen to allow steam to effuse downwardly from the steam-generating chamber into the food steaming chamber, while preventing unvaporized water from draining into said steaming chamber.

14. The apparatus of claim 13 wherein the water inlet means comprises a tube entering the steam-generating chamber and disposed above the heated platen, said tube having at least one orifice therein to permit water to flow therethrough onto the platen.

15. The apparatus of claim 14 wherein the tube extends generally parallel to the platen and includes a plurality of orifices to distribute water generally evenly across the surface of the heated platen.

16. The apparatus of claim 15 wherein the tube is generally horizontal within the housing and the orifices are positioned along the tube between the uppermost and lowermost points of the tube to maintain a level of the water within the tube for cooling purposes.

17. The device of claim 16 wherein the heated platen includes a raised perimeter around the upper surface of the platen and the housing includes a cover which engages the raised perimeter to form a sealed generating chamber.

18. The device of claim 13 wherein the raised perimeter of the aperture means is defined by a tubular insert having a portion thereof extending above the top surface of the platen.

19. A cheese melter for steam heating and melting cheese topping on a food product comprising:
a housing defined by a top, bottom, front, rear and side walls;
a heated platen mounted within the housing to define a steam generating chamber between the upper surface of the platen and the top of the housing, said heated platen including a peripheral upstanding wall and gasket means between the top of said upstanding wall, said housing top to provide a sealed steam generating chamber;
means for delivering water to the upper surface of platen;
a food steaming chamber defined in said housing below the steam generating chamber by said rear and side walls, said steam generating chamber being closed at the front end by a removable closure wall, said closure wall being connected to a food support surface to provide a food support tray to permit food products to be inserted and removed from said food steaming chamber located below said steam generating chamber; and
means providing fluid communication between said steam generating chamber and said food steaming chamber to permit steam generated within the steam generating chamber to be directed on to the food within the food steaming chamber, wherein said means providing fluid communication between the steam generating chamber and the food steaming chamber comprises a plurality of raised perimeter apertures on the upper surface of the heating platen to direct steam generated therein downwardly on to the food within the food steaming chamber while preventing unvaporized water from being transmitted to the food steaming chamber.

20. The cheese melter of claim 19 including water control means for causing a predetermined volume of water to be sprayed on to the upper surface of the heated platen for conversion into steam.

21. The cheese melter of claim 18 wherein the front closure means includes handle means to facilitate the manual removal of the food support plate and food product from the heating chamber.

22. The cheese melter of claim 21 wherein the raised perimeter apertures are formed by drilling holes in the heated platen and inserting and fixing therein tubular elements which extend upwardly above the surface of the heated platen.

23. The cheese melter of claim 19 wherein the raised perimeter apertures are formed by tubular inserts extending upwardly above the upper surface of the heating platen.

* * * * *